(12) United States Patent
Nair et al.

(10) Patent No.: US 11,068,612 B2
(45) Date of Patent: Jul. 20, 2021

(54) MICROARCHITECTURAL TECHNIQUES TO MITIGATE CACHE-BASED DATA SECURITY VULNERABILITIES

(71) Applicant: INTERNATIONAL BUSINESS MACHINES CORPORATION, Armonk, NY (US)

(72) Inventors: Prashant J. Nair, Elmsford, NY (US); Seokin Hong, Chappaqua, NY (US); Alper Buyuktosunoglu, White Plains, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 16/051,719

(22) Filed: Aug. 1, 2018

(65) Prior Publication Data
US 2020/0042732 A1 Feb. 6, 2020

(51) Int. Cl.
*G06F 12/0842* (2016.01)
*G06F 12/0893* (2016.01)
*G06F 21/62* (2013.01)
*G06F 12/0802* (2016.01)
*G06F 12/14* (2006.01)

(52) U.S. Cl.
CPC ...... *G06F 21/6218* (2013.01); *G06F 12/0802* (2013.01); *G06F 2212/1052* (2013.01)

(58) Field of Classification Search
None
See application file for complete search history.

(56) References Cited

U.S. PATENT DOCUMENTS

| 5,764,938 | A | 6/1998 | White et al. | |
|---|---|---|---|---|
| 6,260,190 | B1 | 7/2001 | Ju | |
| 6,389,512 | B1 * | 5/2002 | Mahalingaiah | G06F 9/3812 711/118 |
| 7,010,648 | B2 * | 3/2006 | Kadambi | G06F 9/3842 711/118 |
| 9,477,845 | B2 * | 10/2016 | Boivie | G06F 11/362 |
| 9,678,755 | B2 * | 6/2017 | Abdallah | G06F 9/30058 |
| 10,019,360 | B2 * | 7/2018 | Wang | G06F 12/126 |
| 10,176,006 | B2 * | 1/2019 | Heller | G06F 12/1009 |
| 10,417,000 | B2 * | 9/2019 | Abdallah | G06F 9/3844 |
| 2006/0090063 | A1 * | 4/2006 | Theis | G06F 9/30072 712/239 |
| 2008/0162889 | A1 | 7/2008 | Cascaval et al. | |

(Continued)

OTHER PUBLICATIONS

Mitigating the Cache Data Pollution by Using Branch Path tracking. Song-He et al. IEEE. (Year: 2012).*

(Continued)

*Primary Examiner* — Venkat Perungavoor
(74) *Attorney, Agent, or Firm* — Griffiths & Seaton PLLC

(57) ABSTRACT

Embodiments for mitigating cache-based data security vulnerabilities in a computing environment are provided. Cache pollution due to speculative memory accesses within a speculative path is avoided by delaying data updates to a cache and memory subsystem until the speculative memory accesses are resolved. A speculative buffer is used to maintain the speculative memory accesses such that a state of the cache remains unchanged until the speculative memory accesses are committed.

19 Claims, 16 Drawing Sheets

(56) References Cited

U.S. PATENT DOCUMENTS

| | | | |
|---|---|---|---|
| 2010/0306477 A1* | 12/2010 | Luttrell | G06F 9/383 |
| | | | 711/137 |
| 2013/0304991 A1 | 11/2013 | Bottcher et al. | |
| 2014/0033217 A1 | 1/2014 | Vajda et al. | |
| 2014/0281196 A1* | 9/2014 | Dixon | G06F 12/0804 |
| | | | 711/105 |
| 2014/0281405 A1 | 9/2014 | Streett et al. | |
| 2015/0301962 A1 | 2/2015 | Laughton et al. | |
| 2017/0371671 A1* | 12/2017 | Bonanno | G06F 9/3848 |
| 2018/0165095 A1* | 6/2018 | Bonanno | G06F 9/3844 |
| 2018/0267841 A1* | 9/2018 | Gou | G06F 13/4265 |
| 2019/0272239 A1* | 9/2019 | Hagersten | G06F 12/1475 |
| 2019/0377677 A1* | 12/2019 | Kamikubo | G06F 9/3842 |

OTHER PUBLICATIONS

Instruction Cache Fetch Policies for Speculative Execution. Lee et al. (Year: 1995).*

Performance Aware Speculation Control Using Wrong Usefulness Prediction. Lee et al. IEEE. (Year: 2008).*

* cited by examiner

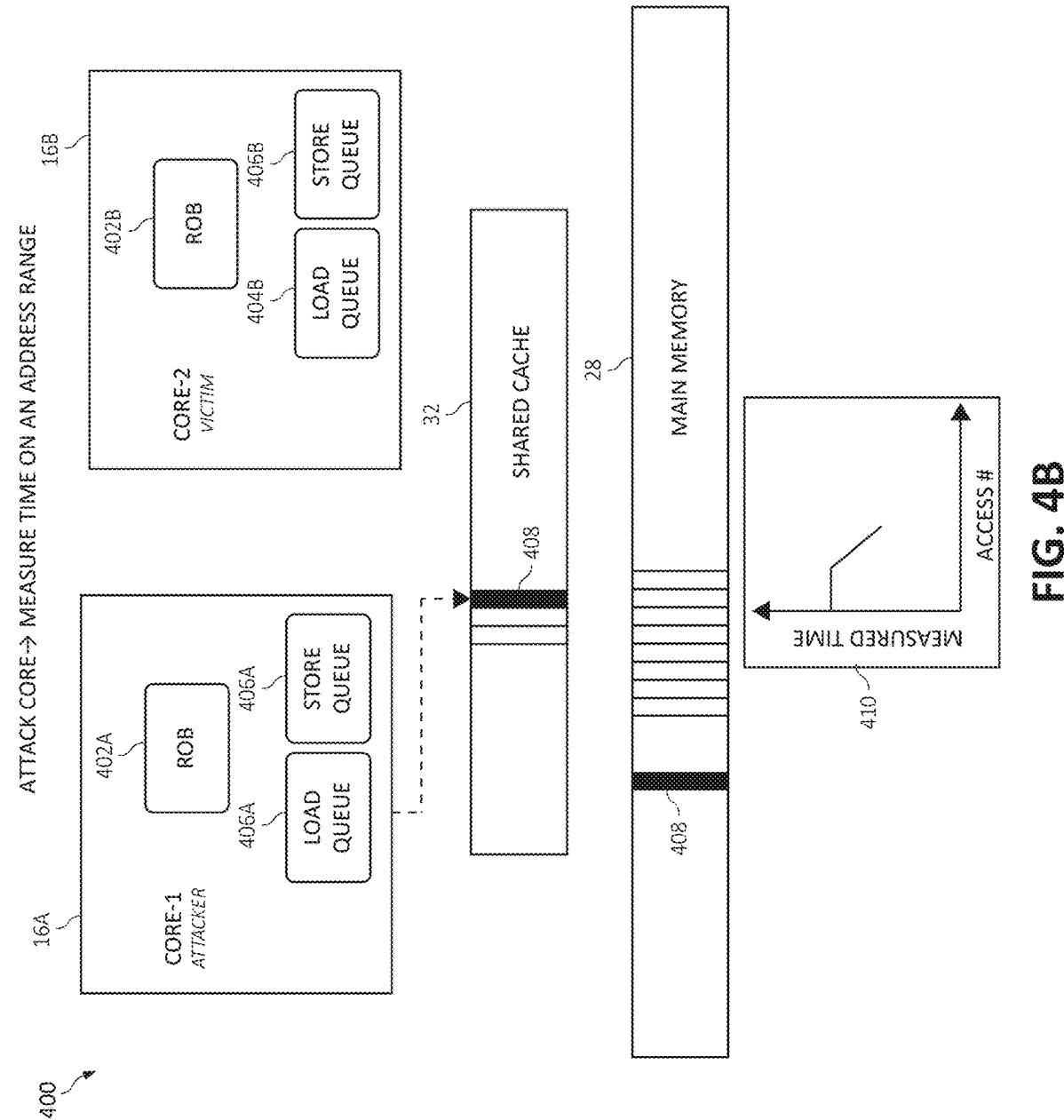

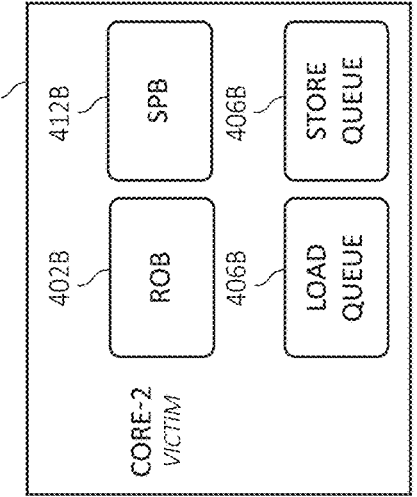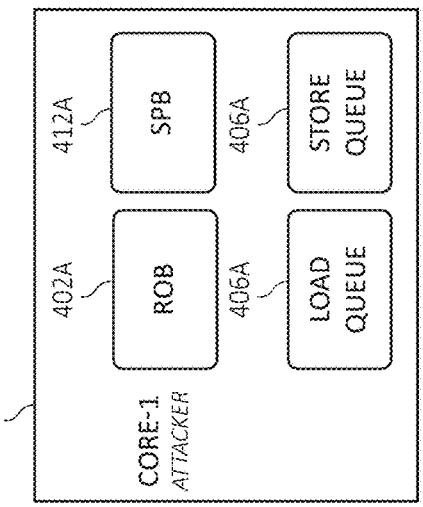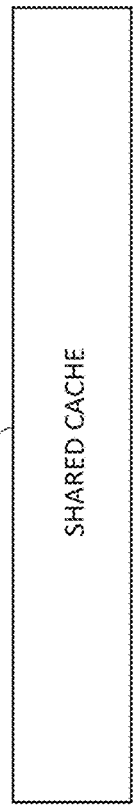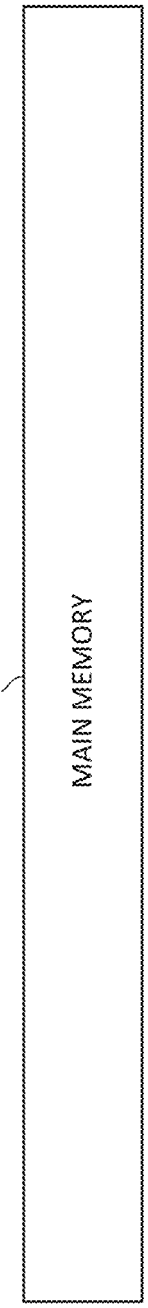
FIG. 5A

MICROARCHITECTURAL TECHNIQUES TO MITIGATE CACHE-BASED DATA SECURITY VULNERABILITIES

BACKGROUND OF THE INVENTION

Field of the Invention

The present invention relates in general to computing systems, and more particularly to, various embodiments for mitigating cache-based data security vulnerabilities within a processor architecture.

Description of the Related Art

A conventional symmetric multiprocessor (SMP) computing system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores. In systems which implement this type of shared cache (such as a level 2 (L2) cache), recent developments have shown that data security vulnerabilities may exist which allow exploitation of various methods in which certain processors execute instructions and store data within the shared cache, potentially allowing unauthorized access to sensitive data contained therein.

SUMMARY OF THE INVENTION

In contemporary computing environments, modern-day processor architectures often implement various techniques to increase performance when processing instructions. For example, one optimization commonly used in the art comprises speculative execution, where the processor performs tasks which may or may not be actually required by programming instructions. Speculative execution increases the parallel execution of instructions by speculating on the outcome of conditional branch instructions and executing the instruction stream as if the speculated guess is correct. With speculation the processor fetches, issues and executes instructions, but the results of the execution are not written back into architected resources until the speculation is resolved. This may be done by separating the completion stage from the commit stage. Results from completed instructions are forwarded into other instructions to allow their speculative execution.

In an instruction after which the control may flow into two or more different locations, speculative execution may be used. Such an instruction is referred to as a branch instruction. A branch instruction may define two or more branch legs. The branch instruction may be conditional and define a condition which defines which of the branch legs is to be taken. For example, the branch instruction may define that if a condition is held, a first branch leg is taken, and if the condition is not held, a second branch leg is taken. During execution, the taken branch leg is executed. However, the non-taken branch leg (also referred to as the Branch-leg Not Taken, or BNT) may also be executed in speculative execution, whose results may be discarded later on if unnecessary.

In some exemplary embodiments, the taken branch leg may be executed speculatively, and those results may be used later on.

In another example, processors often execute instructions out-of-order (via pipelining and parallelization techniques), rather than sequentially. This is performed as sequential execution of workloads may result in decreased performance. For example, using a single process/thread to process a large number of workloads can result in prohibitively long execution latency and limited throughput and waste instructions cycles which otherwise may be used to process additional tasks. Therefore, instructions may sometimes be executed in parallel or even out-of-order, with the results reordered to provide the appearance of in-order execution of the program. While many other optimization techniques exist, these two examples are frequently used to increase computing performance to allow the processor architecture to process and execute tasks faster than would otherwise be possible.

However, employing these types of optimization techniques has opened up several areas for malicious actors to exploit these techniques to their advantage, thereby gaining access to unauthorized data. For example, several data security vulnerabilities have recently become known which exploit the speculative execution and out-of-order instruction processes to gain access to privileged, process, or even kernel data held in the shared cache using various side-channel and timing attacks.

Accordingly, various embodiments are provided for mitigating cache-based data security vulnerabilities in a computing environment, by a processor. In one embodiment, by way of example only, a method comprises avoiding cache pollution due to speculative memory accesses within a speculative path by delaying data updates to a cache and memory subsystem until the speculative memory accesses are resolved. A speculative buffer is used to maintain the speculative memory accesses such that a state of the cache remains unchanged until the speculative memory accesses are committed.

Data elements of speculative memory accesses are flushed from the speculative buffer upon retiring the speculative memory access instructions from a reorder buffer (ROB), and upon flushing the data elements of speculative memory accesses, the data elements of the speculative memory accesses are updated from the speculative buffer to the cache and memory subsystem. A cache coherence status is maintained for each of the data elements of the speculative memory accesses in the speculative buffer, and the cache coherence status is propagated from the speculative buffer to the cache and memory subsystem upon flushing a corresponding data element from the speculative buffer.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 4A-4B are block diagrams depicting a processor and memory architecture having cache-based data security vulnerabilities, according to embodiments of the present invention;

FIGS. 5A-5C are block diagrams depicting a processor and memory architecture for mitigating the cache-based data security vulnerabilities of FIGS. 4A-4B using a speculative buffer, according to embodiments of the present invention;

DETAILED DESCRIPTION OF THE DRAWINGS

Figure 1:
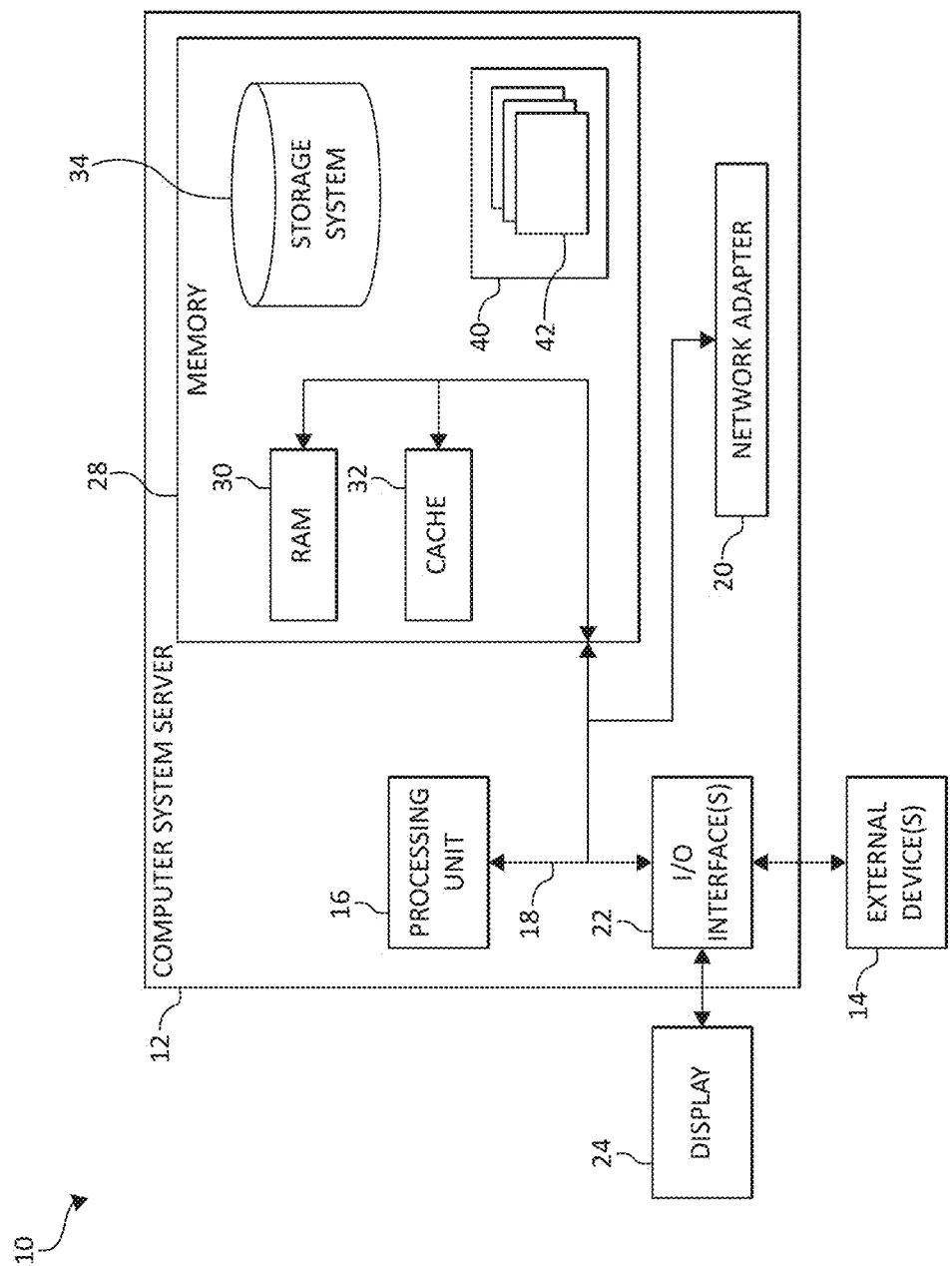
FIG. 1 is a block diagram depicting an exemplary computing node, according to embodiments of the present invention.

As previously mentioned, in contemporary computing environments, modern-day processor architectures often implement various techniques to increase performance when processing instructions. For example, one optimization commonly used in the art comprises speculative execution, where the processor performs tasks which may or may not be actually required by programming instructions. Speculative execution increases the parallel execution of instructions by speculating on the outcome of conditional branch instructions and executing the instruction stream as if the speculated guess is correct. With speculation. the processor fetches, issues and executes instructions, but the results of the execution are not written back into architected resources until the speculation is resolved. This may be done by separating the completion stage from the commit stage. Results from completed instructions are forwarded into other instructions to allow their speculative execution.

In an instruction after which the control may flow into two or more different locations, speculative execution may be used. Such an instruction is referred to as a branch instruction. A branch instruction may define two or more branch legs. The branch instruction may be conditional and define a condition which defines which of the branch legs is to be taken. For example, the branch instruction may define that if a condition is held, a first branch leg is taken, and if the condition is not held, a second branch leg is taken. During execution, the taken branch leg is executed. However, the non-taken branch leg (also referred to as the Branch-leg Not Taken, or BNT) may also be executed in speculative execution, whose results may be discarded later on if unnecessary. In some exemplary embodiments, the taken branch leg may be executed speculatively, and those results may be used later on.

In another example, processors often execute instructions out-of-order (via pipelining and parallelization techniques), rather than sequentially. This is performed as sequential execution of workloads may result in decreased performance. For example, using a single process/thread to process a large number of workloads can result in prohibitively long execution latency and limited throughput and waste instructions cycles which otherwise may be used to process additional tasks. Therefore, instructions may sometimes be executed in parallel or out-of-order, with the results reordered to provide the appearance of in-order execution of the program. While many other optimization techniques exist, these two examples are frequently used to increase computing performance to allow the processor architecture to process and execute tasks much faster than would otherwise be possible.

However, employing these types of optimization techniques has opened up several areas for malicious actors to exploit these techniques to their advantage, thereby gaining access to unauthorized data. For example, several data security vulnerabilities have recently become known which exploit the speculative execution and out-of-order instruction processes to gain access to privileged, process, or even kernel data which is held in the shared cache using various side-channel and timing attacks.

One such vulnerability may allow a malicious actor to exploit the out-of-order execution process of modern processors to read arbitrary physical memory (e.g., even kernel memory) from an unprivileged user process using a covert channel through cache lines (i.e., a side-channel). This vulnerability exploits page tables which contain mappings between virtual memory (used by a process) and physical memory to access kernel addresses mapped into the user space processes. Generally, kernel memory cannot be read from the user space as it is privileged, and doing so causes the processor to issue an exception and discard the read. However, using the known techniques of the out-of-order execution process, this vulnerability may issue reads to kernel memory from an unprivileged user process and leak data to the side-channel before an exception handler is invoked due to its out-of-order execution. The vulnerability exploits the fact that, during these reads, a user space array may be populated which briefly contains the secret data (which is flushed from the user memory before it can be read due to the exception), although this secret data has been cached at a position within the array dependent upon the secret data's value. The unprivileged user process then iterates through the array elements to reveal the cached element, which is returned much faster due to the secret data being stored in the cache. Finding this cache hit may then reveal the contents of the secret data to the malicious actor, thus allowing an unprivileged user process to access secret kernel data.

Another such vulnerability may allow the malicious actor to exploit the branch prediction and speculative execution processes of modern processors to leak data using the covert channel through cache lines (i.e., the side-channel), although in this instance, only memory from a current process may be read rather than kernel and other physical memory. That is, this vulnerability may allow code executing in a victim process to access data the particular victim process should not have access to (e.g., data outside of a sandbox). This vulnerability uses prediction logic which may be trained in modern processors to reliably hit or miss speculative instructions, and using this logic may further use a cache timing attack to determine which unauthorized data has been loaded into a cache line. The unauthorized data is leaked using the side-channel by searching for portions where the speculation would access otherwise inaccessible data, manipulate the processor into a state where its speculative execution retrieves such data, and then time reads to determine which elements of the unauthorized data have been loaded into the cache lines upon performing the speculative execution.

Accordingly, to mitigate the pollution of the shared cache with such data, various embodiments are provided herein for mitigating cache-based data security vulnerabilities in a computing environment. As mentioned, one method comprises avoiding cache pollution due to speculative memory accesses within a speculative path by delaying data updates to a cache and memory subsystem until the speculative memory accesses are resolved. A speculative buffer is used to maintain the speculative memory accesses such that a state of the cache remains unchanged until the speculative memory accesses are committed. In this way, timing attacks such as those aforementioned vulnerabilities are mitigated when using the speculative buffer prior to the speculative memory accesses being committed, as an attacker (or attack core) is not able to time which of the data produces a cache hit, as all the committed data is populated into the cache simultaneously. Other examples of various aspects of the illustrated embodiments, and attendant benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
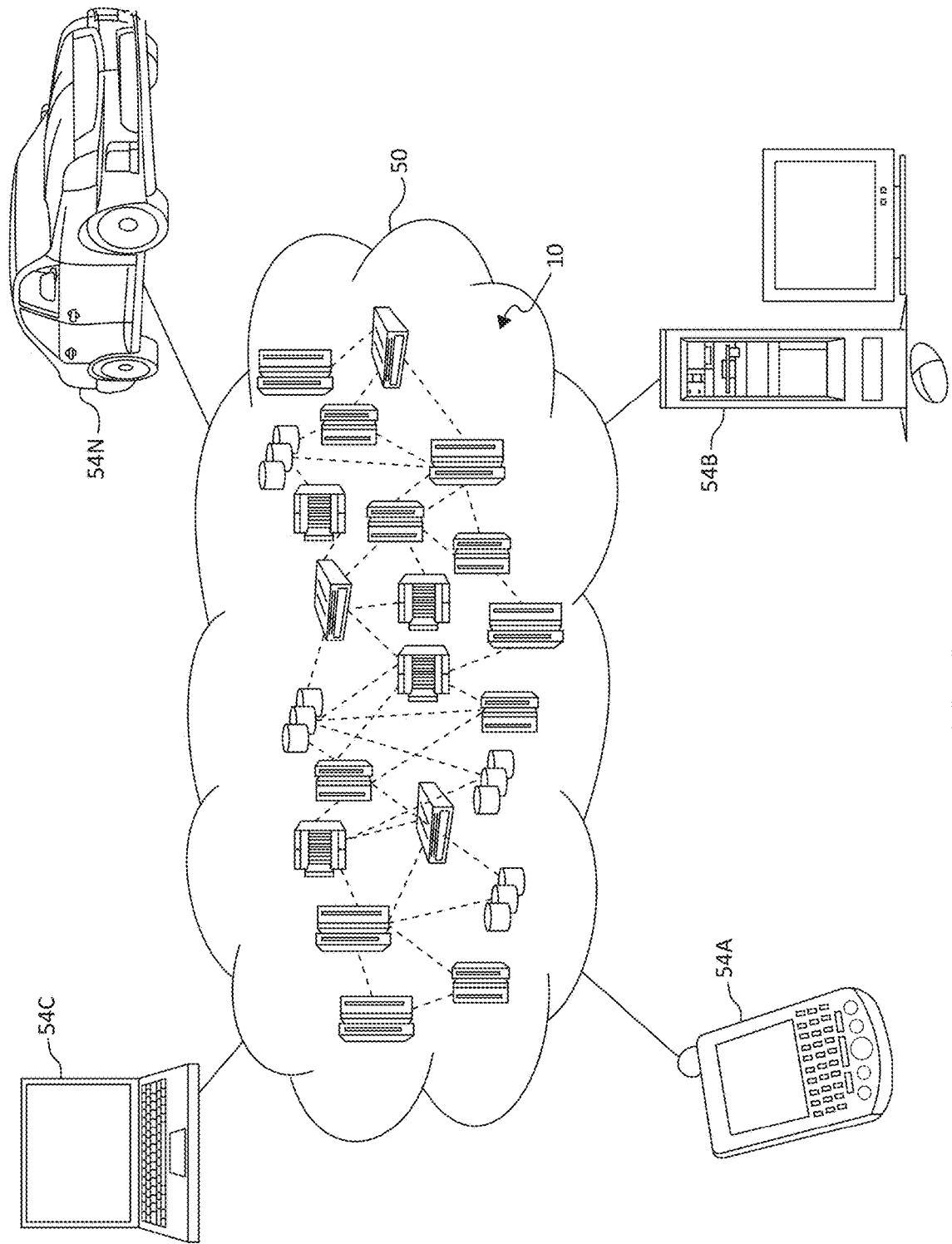
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
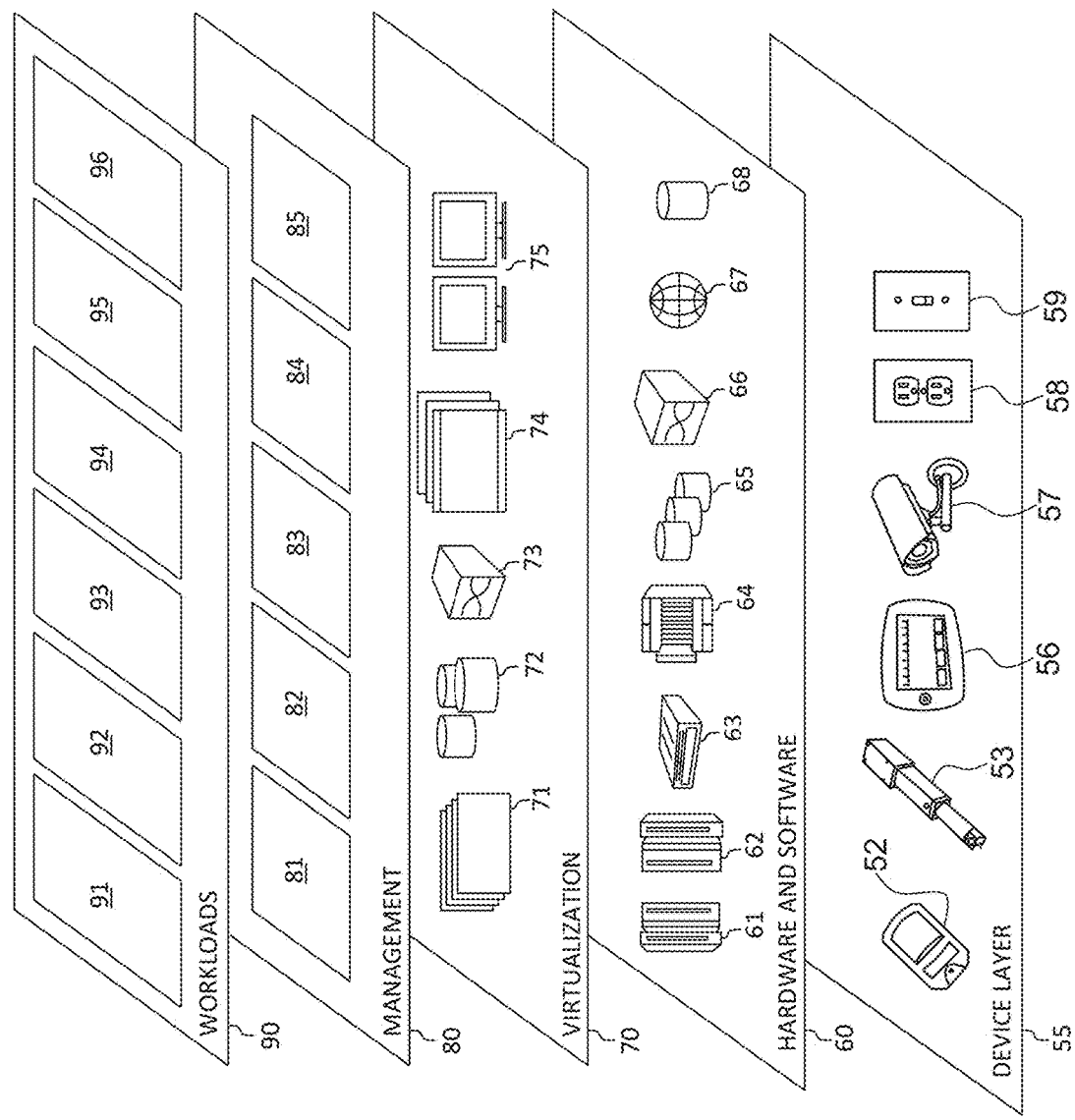
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security functionality 96. One of ordinary skill in the art will appreciate that the data security functionality 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
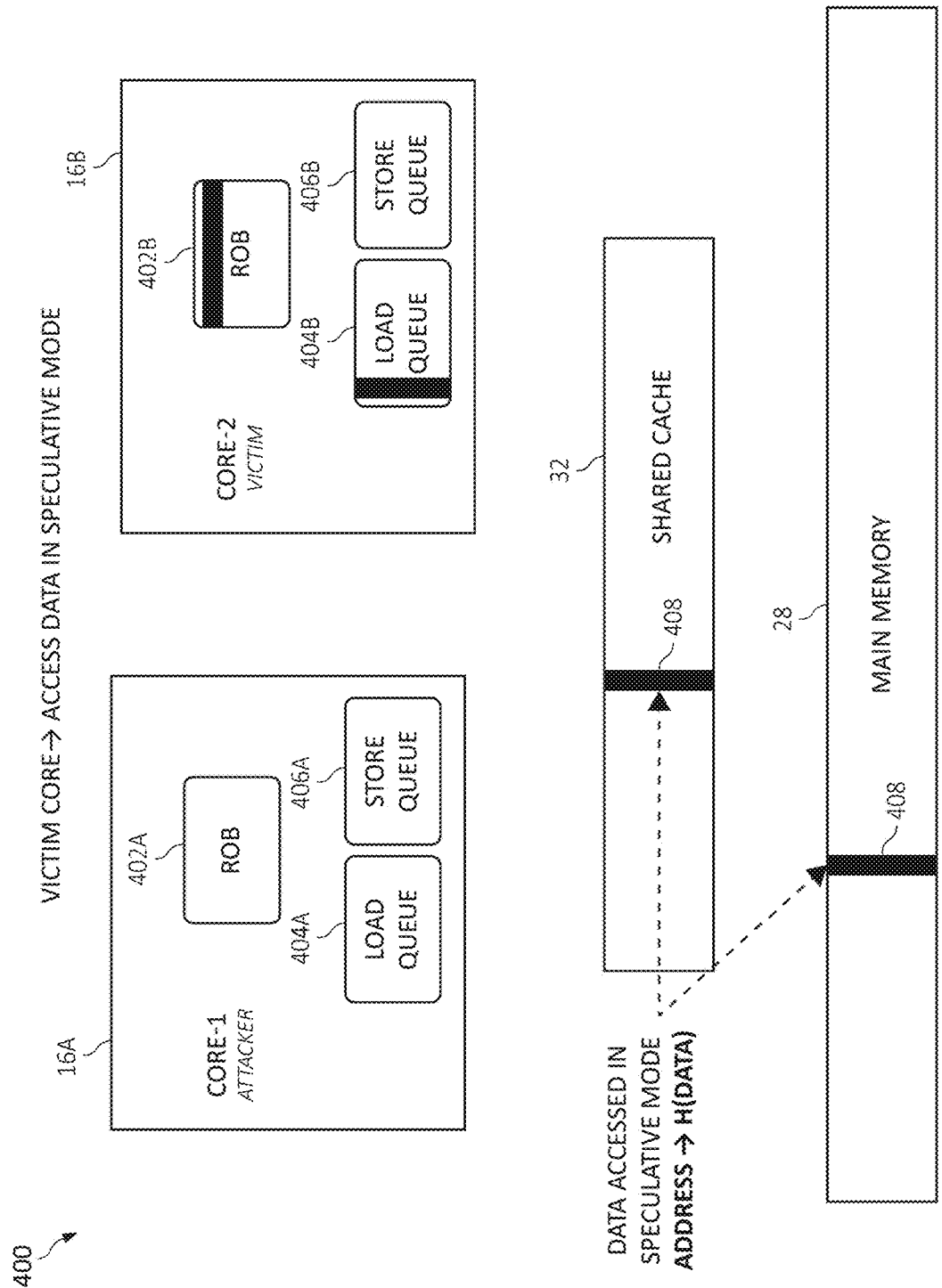

Turning now to FIGS. 4A and 4B, block diagrams of a processor and memory architecture 400 having cache-based data security vulnerabilities are depicted. As will be seen, many of the functional blocks comprise hardware elements implementing "modules" of functionality, in the same descriptive sense as has been previously described in FIGS. 1-3. Architecture 400 includes a first processor core 16A ("attacker core") and a second processor core 16B ("victim core") of the processor 16. Each of the processor cores 16A, 16B of the processor 16 include, respectively, a reorder buffer (ROB) 402A, 402B, a load queue 404A, 404B, and a store queue 406A, 406B. The cache 32 is shared amongst the processor cores 16A, 16B, which sends and retrieves I/O data from the memory subsystem 28. As mentioned previously, to perform the attack, a cache flush and reload process is initiated to extract information from a cache hit of the cache 32. This cache 32, which again is shared amongst the processor cores 16A, 16B, may contain data from a speculated path.

The process begins by using the processor core 16A to flush all data in the cache 32, which creates a template for a cache timing attack. The processor core 16A manipulates the processor core 16B to access data 408 (H(Data)) in speculative mode to place the required entry within the cache 32. The processor core 16A then iterates through a large user space array and measures the time spent on a particular address range to determine which data elements are stored in the cache 32, where the data 408 is inherently stored within the cache 32 upon determining a cache hit using the lowest (fastest) measured access time 410. Using the address of the data 410, the processor core 16A may then determine what the data comprises based upon its known address when accessed in the cache 32.

Figure 5B:
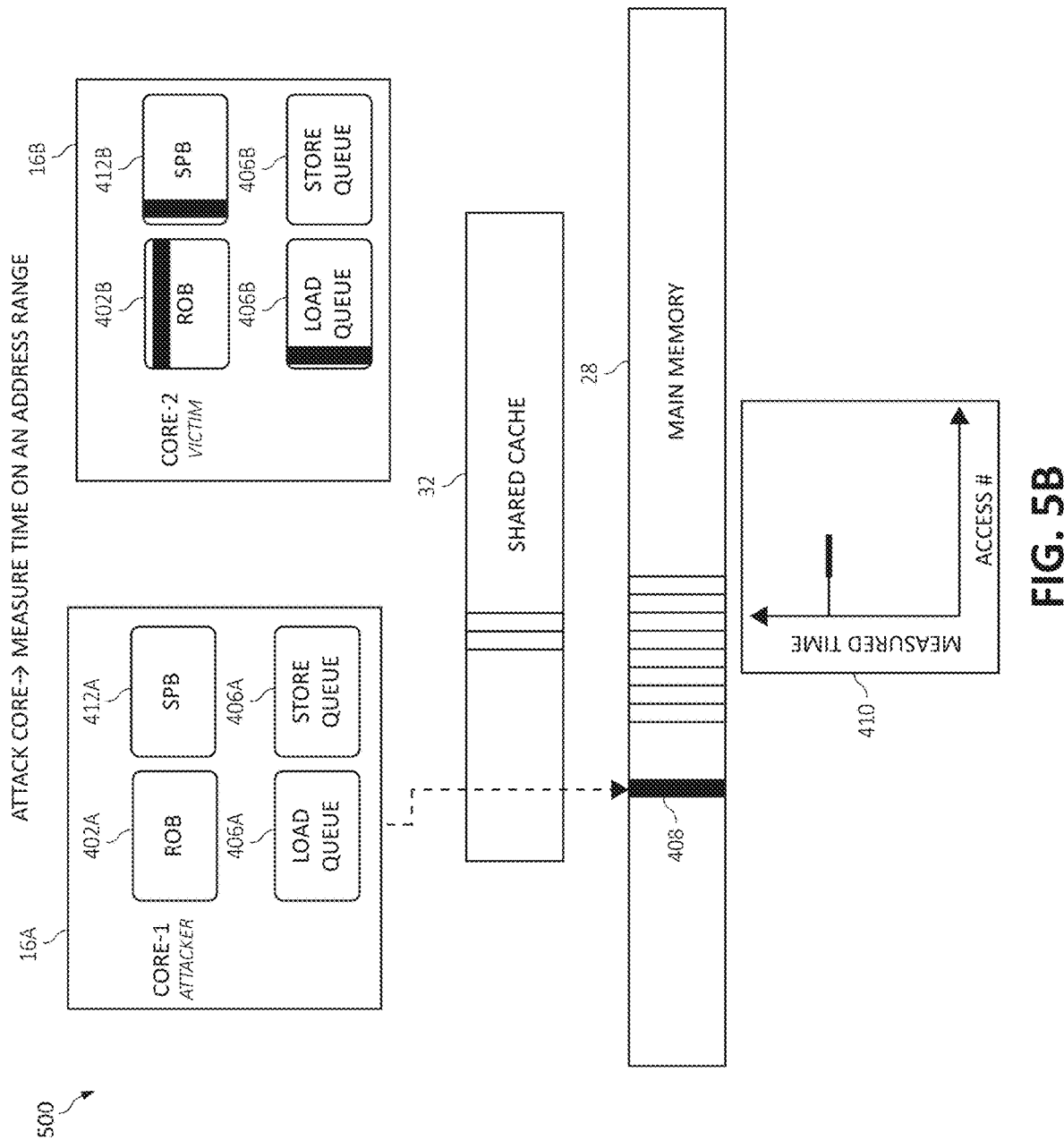
Figure 5C:
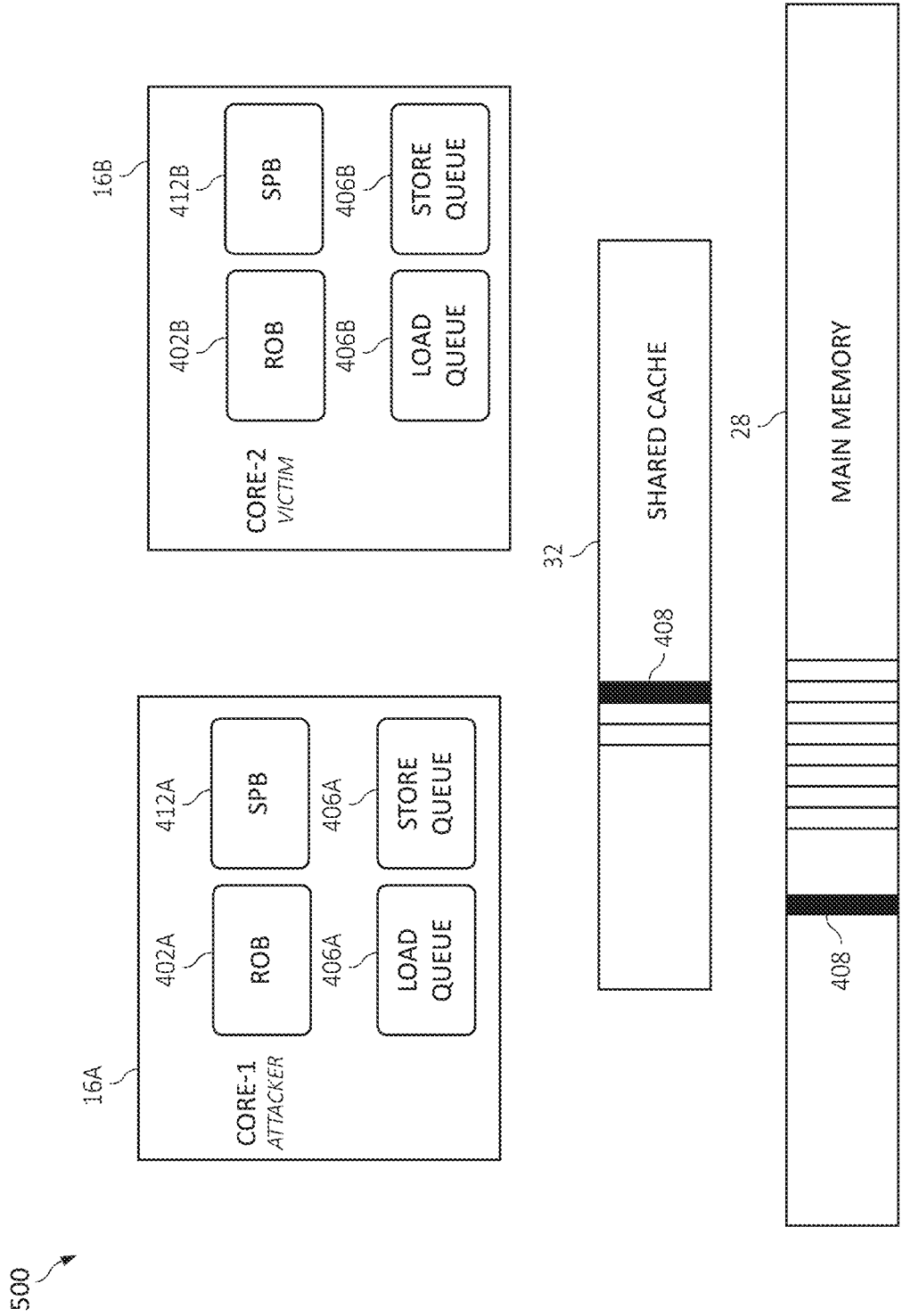

Referring now to FIGS. 5A-5C, a processor and memory architecture 500 is depicted for mitigating the cache-based data security vulnerabilities of FIGS. 4A-4B using a speculative buffer. The mechanisms of the present invention use the speculative buffer 412A, 412B (depicted within processor cores 16A, 16B, respectively) to keep the state of the cache 32 unchanged during speculation. The speculative buffer 412A, 412B is used to manage, maintain, and/or keep track of all speculative memory accesses. That is, when data is read from a speculative memory access, this data is read into the speculative buffer 412A, 412B such that any updates to the cache 32 and/or memory subsystem 28 are delayed until the speculative memory accesses are resolved. Referring back to FIGS. 5B and 5C, it can be seen that the data 408 is thus read into and maintained within the speculative buffer 412B of the processor core 16B such that no change in access timings are discovered, and thus the processor core 16A is not able to determine which speculated data is held within the cache 32 using the measured access time 410, as the data 408 has not yet been placed into the cache 32 (i.e., all access times appear to the processor core 16A to come from the memory subsystem 28 as a cache miss). Because the processor core 16A is unable to determine which speculated data is held within the cache 32, the processor core 16A is therefore unable to discern the memory address thereof which mitigates the leaking/pollution of the speculated data in the cache 32. The speculative buffer 412A, 412B flushes the data 408 of the speculative accesses upon being committed/retired from the ROB 402A, 402B, and upon committing the speculative memory accesses, the data 408 thereof is only then propagated through the cache 32 (see FIG. 5C).

Figure 6:
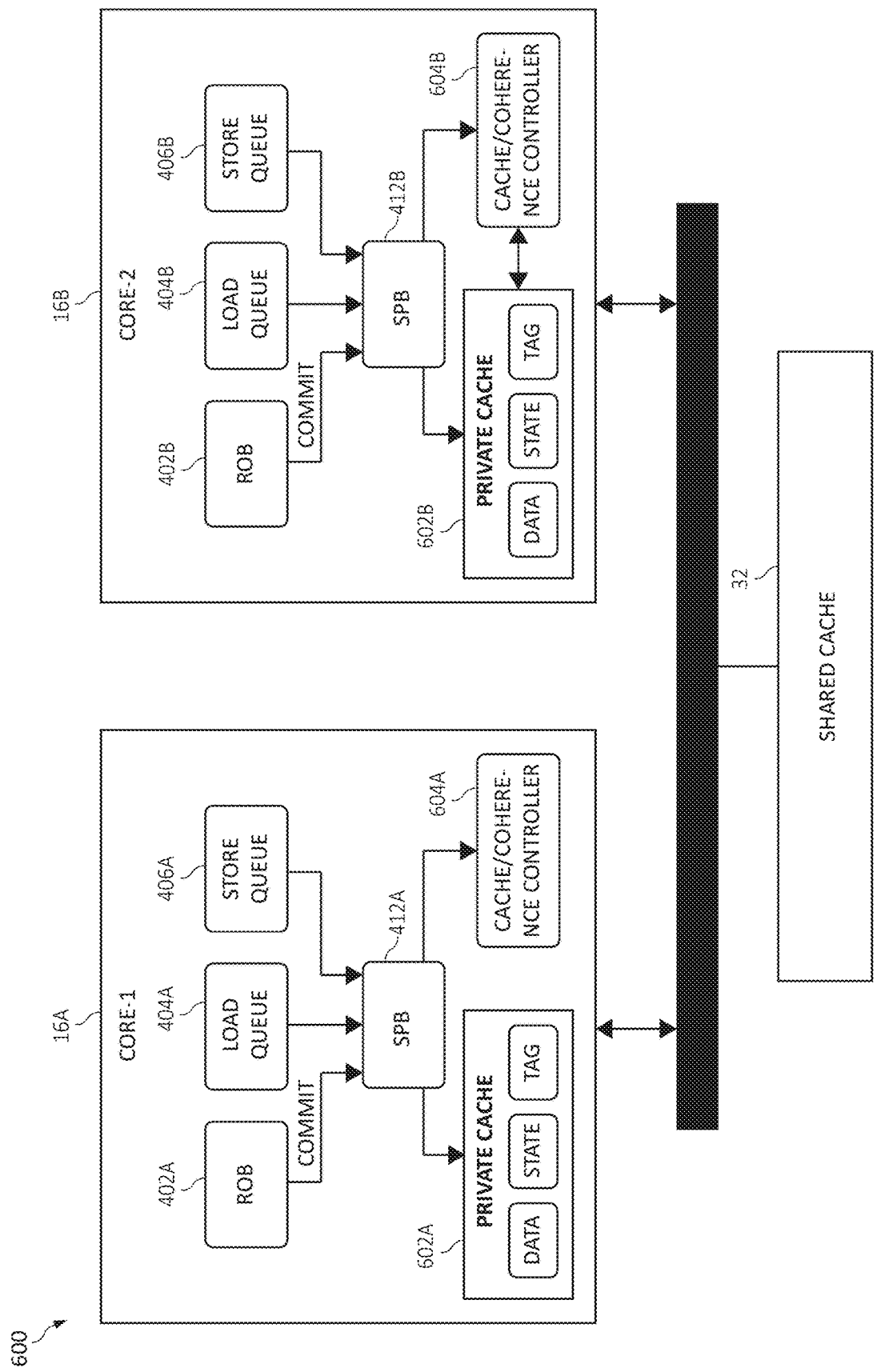
FIG. 6 is a block diagram depicting a processor and memory architecture illustrating cache coherence using the speculative buffer, according to embodiments of the present invention

Turning now to FIG. 6, a block diagram depicting a processor and memory architecture 600 illustrating cache coherence using the speculative buffer 412A, 412B is depicted. Within architecture 600, the processor cores 16A, 16B further include, respectively, a private cache 602A, 602B, which includes data, state, and tag information. The processor cores 16A, 16B further include, respectively, a cache/coherence controller 604A, 604B for maintaining a coherence state of data elements within the cache line loaded into the speculative buffer 412A, 412B. This coherence state or status for all elements within the speculative buffer 412A, 412B is propagates from the speculative buffer 412A, 412B to the caches (cache 32 and private cache 604A, 604B) when the corresponding element in the speculative buffer 412A, 412B is flushed. That is, when a speculative memory access is committed, the cache hierarchy (cache 32 and private cache 604A, 604B) retrieves the data 408 from the speculative buffer 412A, 412B, and propagates the data 408 and its corresponding state data through each cache so that it becomes visible to other processor cores. It is at this time the coherence state in the caches is updated to the coherence state maintained within the speculative buffer 412A, 412B.

Figure 7:
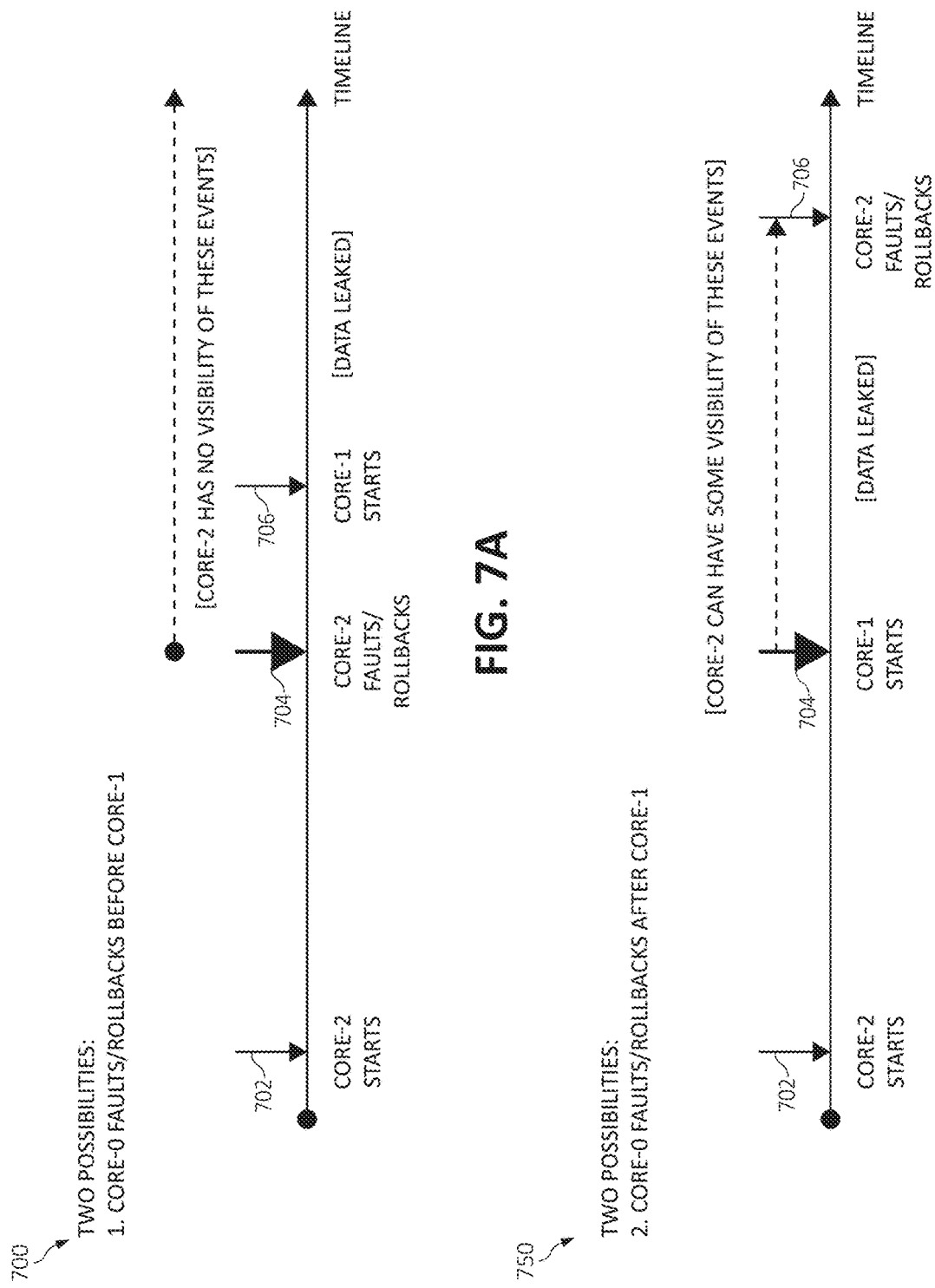
FIGS. 7A-7B are graph diagrams depicting an attack timeline when employing a covert side-channel to leak cache data, according to embodiments of the present invention.

Continuing, FIGS. 7A-7B are graph diagrams depicting an attack timeline when employing a covert side-channel to leak cached data. Diagram 700 of FIG. 7A represents a first possibility where the processor core 16B (victim core) faults/rollbacks data (due to an exception) before the processor core 16A (attacker core) obtains unauthorized data via the cache 32. As depicted in diagram 700, the processor core 16B commences execution of an instruction at 702 (e.g., to retrieve data from an arbitrary kernel address) from an attacking application within the user space. Upon discovering that the attacking application does not have privileges to read the kernel memory, the processor core 16B faults and issues an exception at 704. The processor core 16B then typically rolls back the results of this computation using snapshot techniques, etc. to return to its earlier state. However, processor core 16A is able to derive which data has already been brought into the cache 32 according to the kernel address at 706. Thus, from 706 onward, data is leaked through a covert side-channel to using the attacking application executed by processor core 16A by deriving and retrieving the kernel data held in the cache 32. It should be noted that the processor core 16B has no visibility of the events taking place from 704 until the data breach at 706.

Diagram 750 of FIG. 7B represents a second possibility where the processor core 16B (victim core) faults/rollbacks data (due to an exception) after the processor core 16A (attacker core) obtains unauthorized data via the cache 32. As depicted in diagram 750, the processor core 16B commences execution of an instruction at 702 (e.g., to retrieve data from an arbitrary kernel address) from the attacking application within the user space. However, prior to discovering that the attacking application does not have privileges to read the kernel memory, the processor core 16A derives which data has already been brought into the cache 32 according to the kernel address at 704 and the kernel data therein is leaked via the covert side-channel (i.e., cache lines) to the processor core 16A. The processor core 16B then rolls back the results of this computation to return to its earlier state at 706, although the kernel data has already been leaked via the cache 32 prior to issuing the exception. It should be noted that the processor core 16B can have some visibility of the events taking place from 704 during the data breach at 706.

Figure 8:
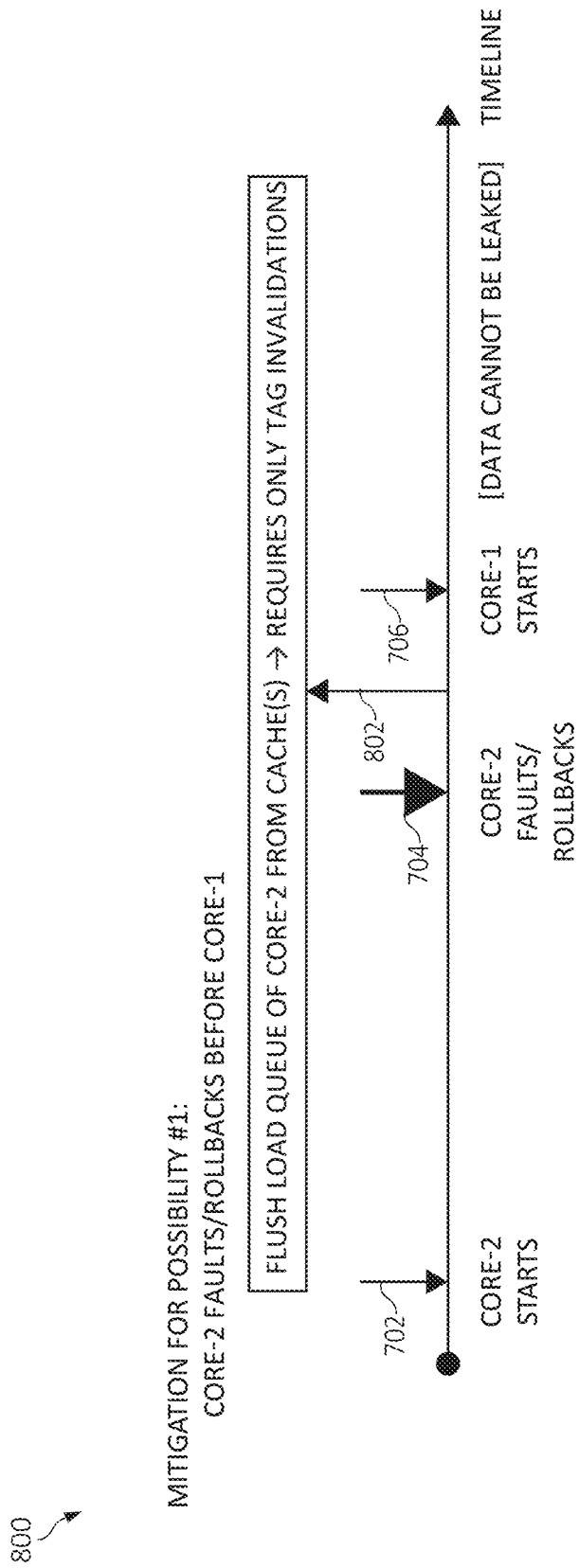
FIG. 8 is a graph diagram depicting a mitigation technique of flushing a load queue to reduce the usage of the covert side-channel to leak the cache data, according to embodiments of the present invention.

To mitigate the first possibility (where processor core 16B faults before retrieving unauthorized data by the processor core 16A), FIG. 8 depicts a mitigation technique and timeline 800 of flushing a load queue to reduce the usage of the covert side-channel to leak the cached data. As depicted in diagram 800, the processor core 16B commences execution of the instruction at 702 (e.g., to retrieve data from an arbitrary kernel address) from the attacking application within the user space. Upon discovering that the attacking application does not have privileges to read the kernel memory, the processor core 16B faults and issues an exception at 704. The processor core 16B then rolls back the results of this computation to return to its earlier state, however, commensurate with the processor core 16B issuing the exception, the load queue 404B of the processor core 16B is flushed from cache(s) 602B and/or cache 32. Hence, when the processor core 16A commences execution in attempt to create a timing attack to derive which data is within cache, the data value cannot be leaked as all data is flushed to the memory subsystem 28 (and thus the timing attack value for determining the cache hit will always be large).

Figure 9A:
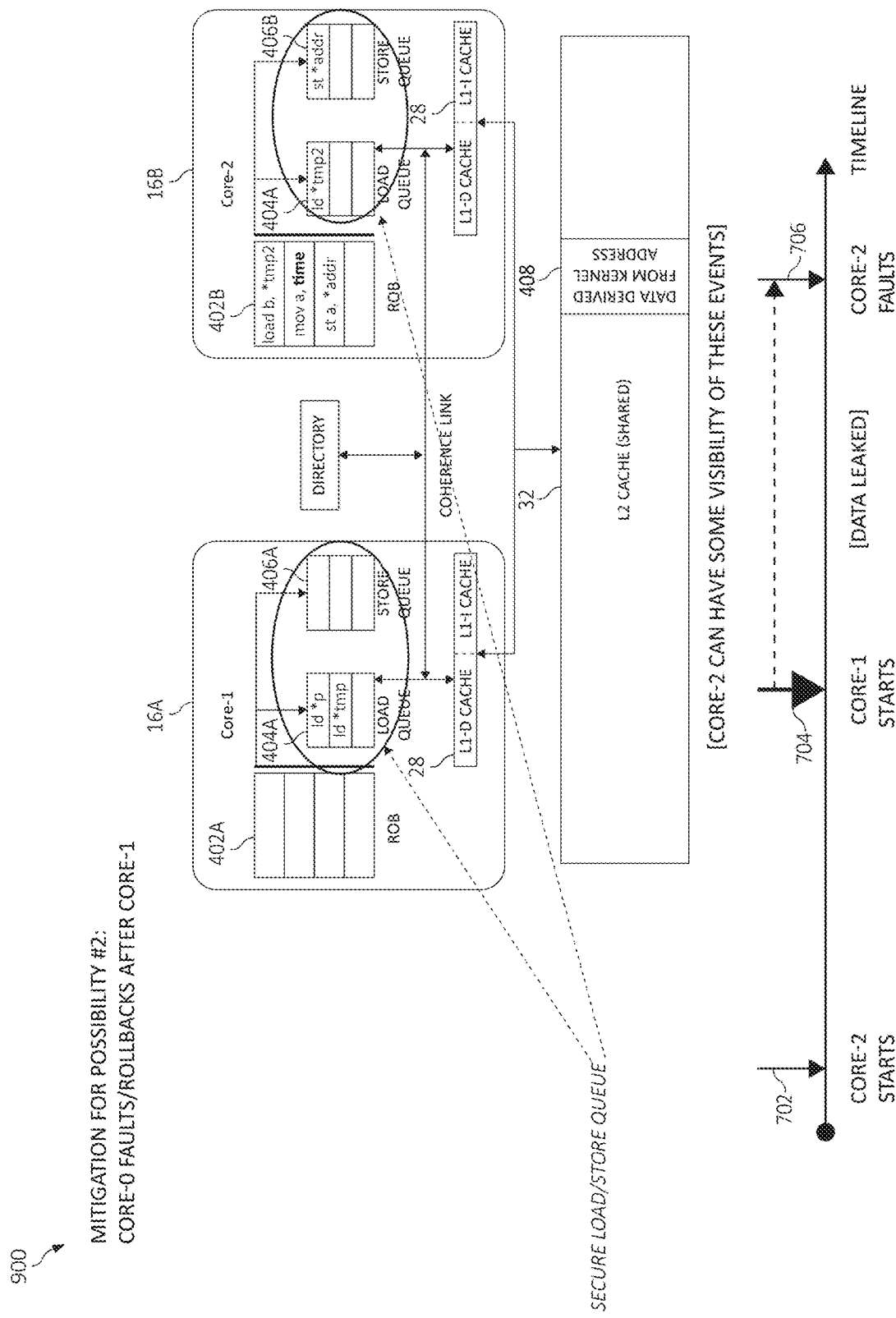
FIGS. 9A-9C are block/graph diagrams depicting an additional mitigation technique of using a secure load queue to reduce the usage of the covert side-channel to leak the cache data, according to embodiments of the present invention.
Figure 9B:
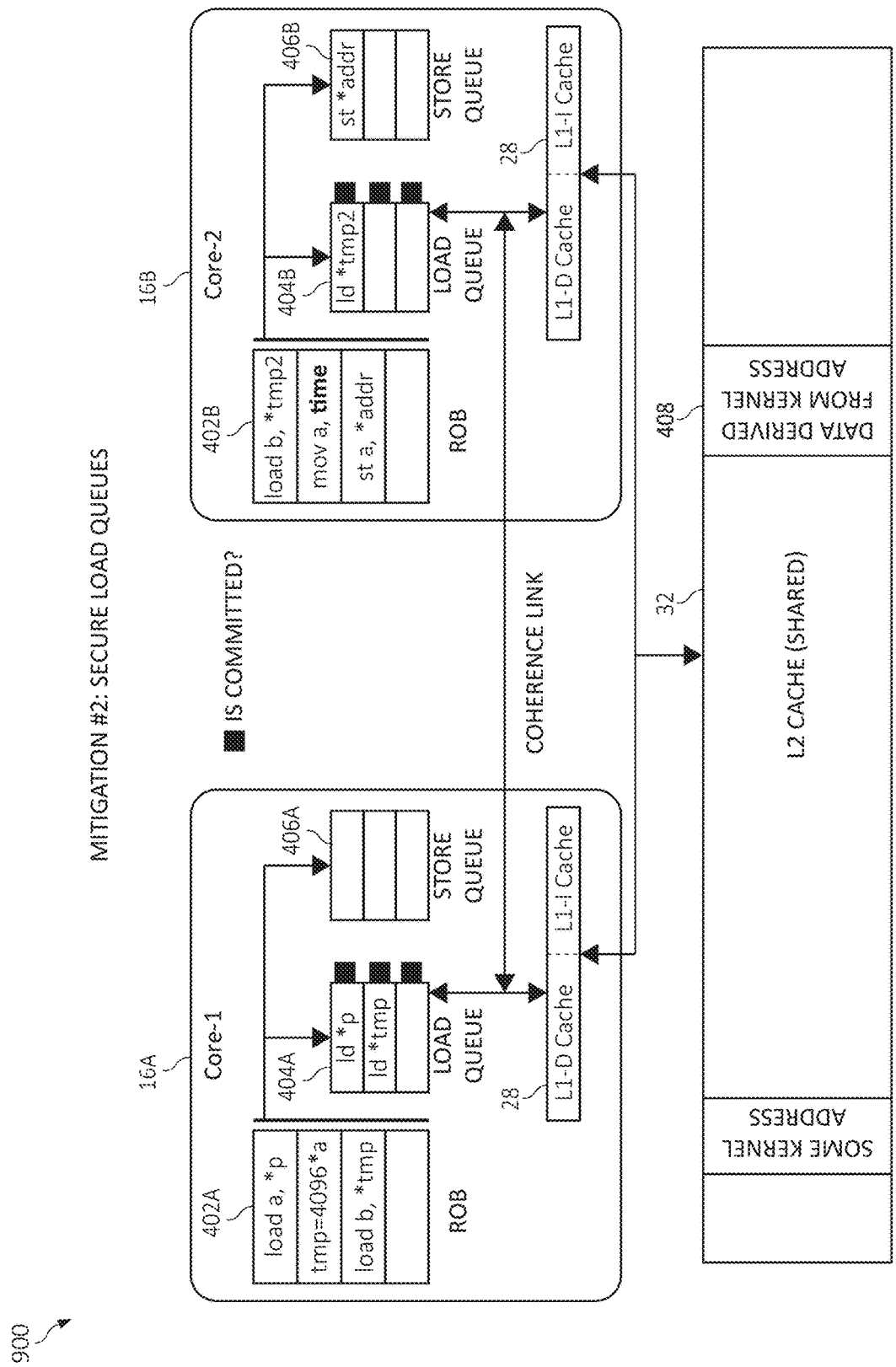
Figure 9C:
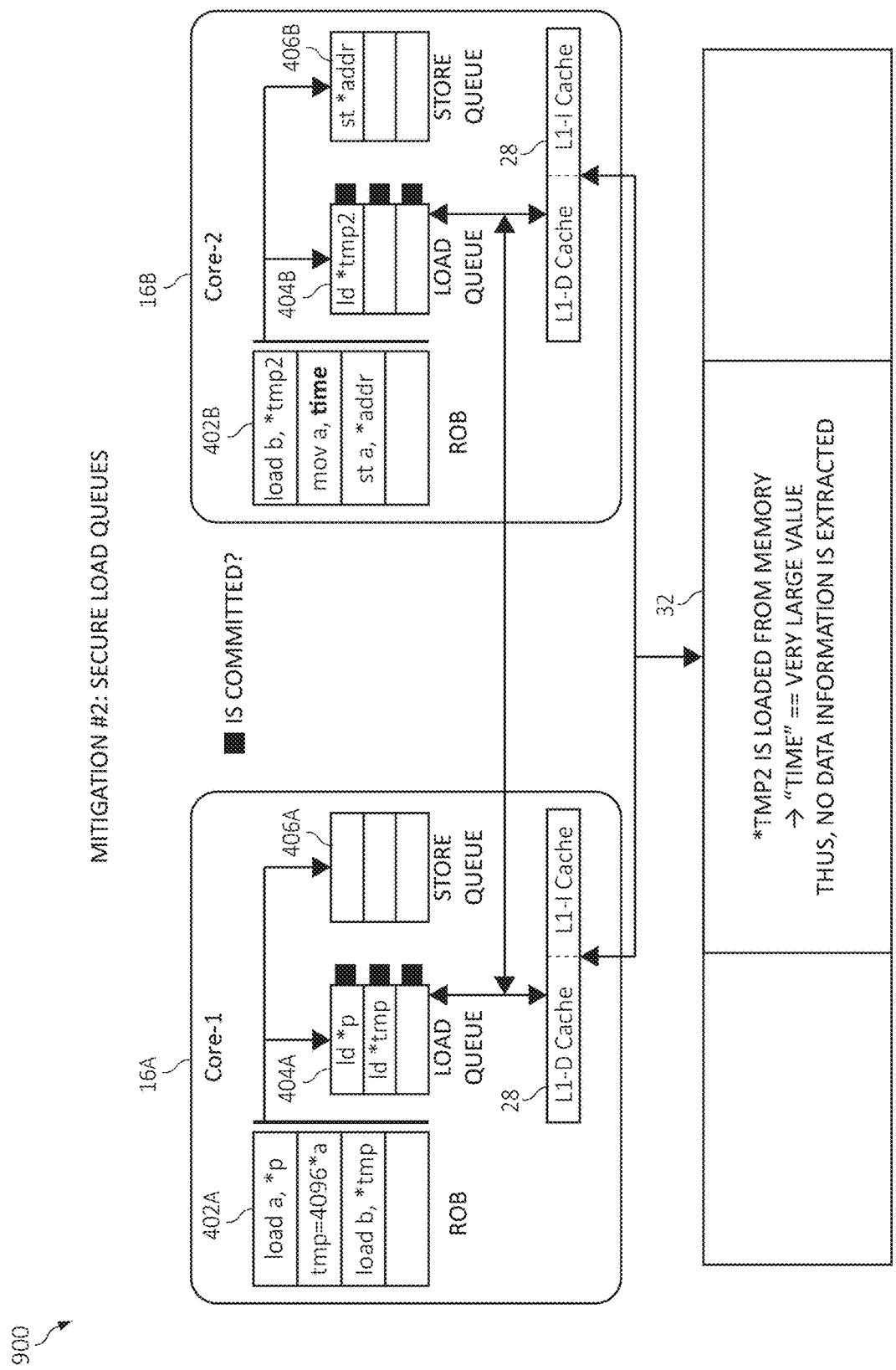

To mitigate the second possibility (where processor core 16B faults after retrieving unauthorized data by the processor core 16A), FIGS. 9A-9C are block/graph diagrams depicting an architecture 900 of an additional mitigation technique using secure load queues to reduce the usage of the covert side-channel to leak the cached data. More particularly, FIGS. 9A-9C depict using the secure load queues to prevent vulnerable data to be timed by an attacker. The secure load queues may include the load queue 404A, 404B and store queue 406A, 406B of processor cores 16A, 16B, respectively. Referring now to FIG. 9B, the secure load queues maintain information as to whether the ROB 402A, 402B has committed speculative data (i.e., from speculative memory accesses) and atomically update this information upon determining the data has been committed. In some embodiments, when the processor core 16A attempts to load an address that is in an uncommitted stage in processor core 16B's load queue 404B, this data is loaded from the memory subsystem 28 (only for the first access). Referring to FIG. 9C, it can be seen that within the load queue 404B of processor core 16B, the data "*tmp2" is loaded from the memory subsystem 28, and thus a timing attack would be unable to discern this data as being cached as there is no cache hit. This mitigates any data information from being extracted as this data is directly retrieved from memory.

Figure 10:
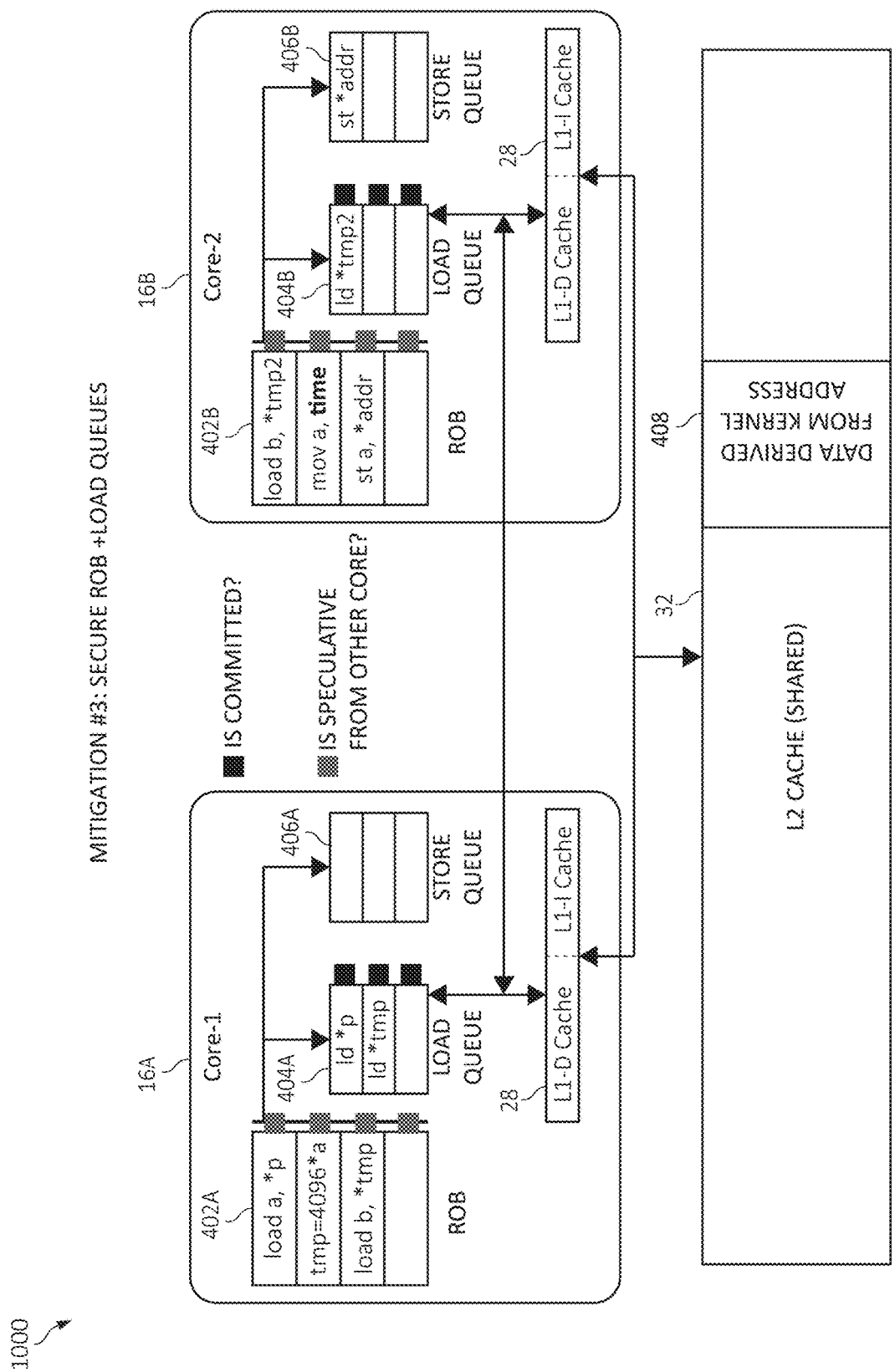
FIG. 10 is a graph diagram depicting still an additional mitigation technique of using secure load and reorder buffer (ROB) queues to reduce the usage of the covert side-channel to leak the cache data, according to embodiments of the present invention.

In an additional mitigation technique, FIG. 10 depicts an additional architecture 1000 of a mitigation technique of using secure load and ROB queues to reduce the usage of the covert side-channel to leak the cached data. Using this mitigation technique, the ROB 402A, 402B of processor cores 16A, 16B maintains information as to whether the data within the load queue 404A, 404B is speculative in another core. That is, the ROB 402A of processor core 16A maintains whether the data information in the load queue 404A is speculative within the load queue 404B of the processor core 16B. If a fault/rollback occurs in one of the processor cores 16A, 16B, the ROB 402A, 402B of the other processor cores will re-execute their speculative instructions, of which load instructions are directly retrieved from the memory subsystem 28.

In an additional mitigation technique, and referring back to FIGS. 9A-9C, trackable secure load queues are used to maintain information as to whether the ROB 402A, 402B has committed the data. During regular operation, load(s) of speculative data into the load queue 404A, 404B in other processor cores do not incur "high" memory latency. Thus, if processor core 16A with a speculative load (of speculative data within the load queue 404A) generates a fault/exception, the processor core 16B is checked for the data having the same address value. If the same address value is found in both the load queue 404A, 404B of both processor cores 16A, 16B, the cores are halted and execution is ceased.

In some embodiments, a separate buffer may also be incorporated to keep track/maintain transient loads into the load queue 404A, 404B. This separate buffer may be flushed on encountering a branch misprediction or exception. In other embodiments, and more particularly in a multi-threaded scenario, transient instructions may also be tracked and maintained within each processor core 16A, 16B thereby extending the same logic as discussed above relative to the processor core 16A, 16B mitigation(s).

Figure 11:
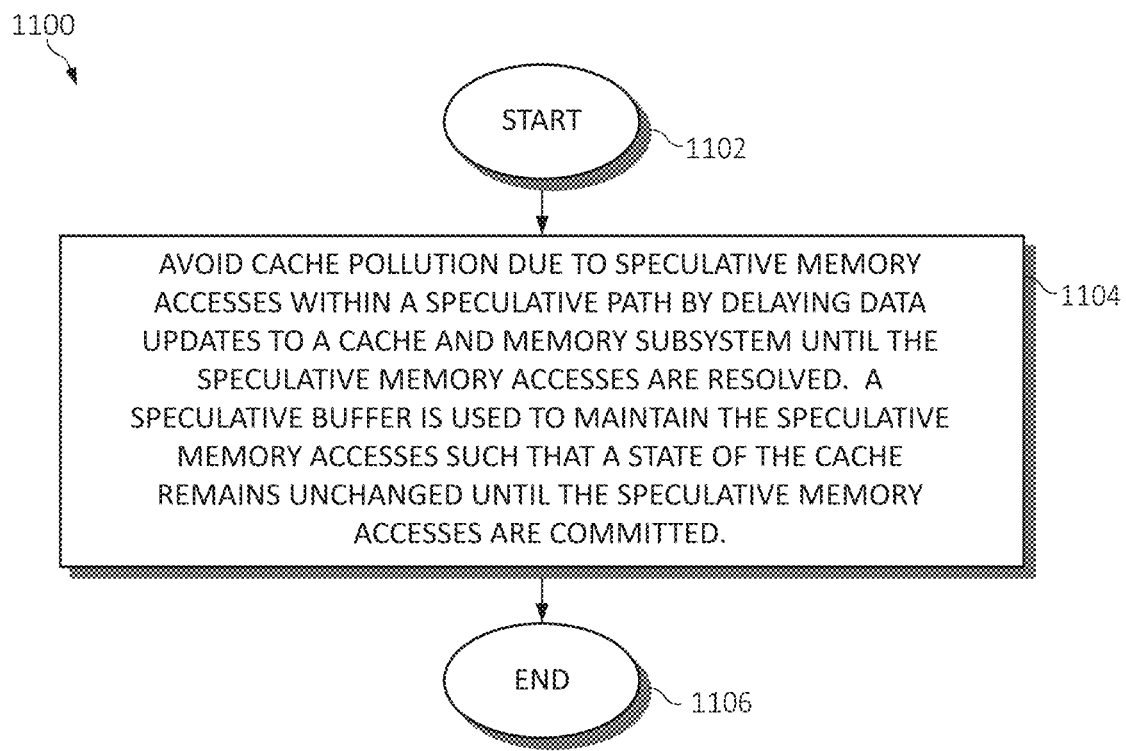
FIG. 11 is a flow chart diagram depicting a method for mitigating cache-based data security vulnerabilities in a computing environment, according to embodiments of the present invention.

Now referring to FIG. 11, a flow chart diagram depicting a generalized method 1100 for mitigating cache-based data security vulnerabilities in a computing environment is illustrated. The method 1100 begins at step 1102 by avoiding cache pollution due to speculative memory accesses within a speculative path by delaying data updates to a cache and memory subsystem until the speculative memory accesses are resolved. A speculative buffer is used to maintain the speculative memory accesses such that a state of the cache remains unchanged until the speculative memory accesses are committed (step 1104). This speculative buffer may be used in conjunctions with the additional techniques described in FIGS. 8-10 to mitigate the distribution of unauthorized data through a covert side-channel. The method 1100 ends (step 1106).

It should be noted that the techniques described herein may be used for multiple shared processes, threads, and processor cores. These attack mitigation techniques may further be extended to any type of shared cache and/or memory subsystems including data caches (dCache) and instruction caches (iCache). Indeed, any shared process, thread or instruction using shared memory structures may benefit from the methods described hereinabove, as one of ordinary skill in the art would appreciate.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for mitigating cache-based data security vulnerabilities in a computing environment, by a processor, comprising:
   reading data elements from speculative memory accesses into a speculative buffer maintained exclusively to hold data from the speculative memory accesses, wherein the speculative buffer is associated with each processor core of a plurality of processor cores;
   delaying data updates of the data elements from the speculative memory accesses to a cache and memory subsystem visible to each of the plurality of processor cores until the speculative memory accesses are committed from a reorder buffer (ROB), wherein the data elements of the speculative memory accesses are withheld from propagation throughout the cache and memory subsystem until being committed so as to appear to the plurality of processor cores as cache misses notwithstanding whether the data elements were read into the speculative buffer from the cache;
   flushing the data elements of the speculative memory accesses from the speculative buffer upon retiring the speculative memory accesses from the ROB; and
   flushing the speculative buffer upon encountering a branch misprediction or exception using the speculative memory accesses.

2. The method of claim 1, further including, upon flushing the data elements of speculative memory accesses, updating the data elements of the speculative memory accesses from the speculative buffer to the cache and memory subsystem.

3. The method of claim 2, further including maintaining a cache coherence status for each of the data elements of the speculative memory accesses in the speculative buffer.

4. The method of claim 3, further including propagating the cache coherence status from the speculative buffer to the cache and memory subsystem upon flushing a corresponding data element from the speculative buffer.

5. The method of claim 1, further including, upon determining a fault or rollback within a first processor core of the plurality of processor cores, commanding a re-execution of speculative instructions within the ROB of a second processor core of the plurality of processor cores; wherein the speculative instructions are directly fetched from the memory subsystem.

6. The method of claim 1, wherein the cache is a shared cache between at least one of the plurality of processor cores, multiple threads, and multiple processes.

7. A system for mitigating cache-based data security vulnerabilities in a computing environment, the system comprising:
   a processor executing instructions stored in a memory subsystem including a cache; wherein when executing the instructions, the processor:
   reads data elements from speculative memory accesses into a speculative buffer maintained exclusively to hold data from the speculative memory accesses, wherein the speculative buffer is associated with each processor core of a plurality of processor cores;
   delays data updates of the data elements from the speculative memory accesses to a cache and memory subsystem visible to each of the plurality of processor cores until the speculative memory accesses are committed from a reorder buffer (ROB), wherein the data elements of the speculative memory accesses are withheld from propagation throughout the cache and memory subsystem until being committed so as to appear to the plurality of processor cores as cache misses notwithstanding whether the data elements were read into the speculative buffer from the cache;
   flushes the data elements of the speculative memory accesses from the speculative buffer upon retiring the speculative memory accesses from the ROB; and
   flushes the speculative buffer upon encountering a branch misprediction or exception using the speculative memory accesses.

8. The system of claim 7, wherein the processor, upon flushing the data elements of speculative memory accesses, updates the data elements of the speculative memory accesses from the speculative buffer to the cache and memory subsystem.

9. The system of claim 8, wherein the processor maintains a cache coherence status for each of the data elements of the speculative memory accesses in the speculative buffer.

10. The system of claim 9, wherein the processor propagates the cache coherence status from the speculative buffer to the cache and memory subsystem upon flushing a corresponding data element from the speculative buffer.

11. The system of claim 7, wherein the processor, upon determining a fault or rollback within a first processor core of the plurality of processor cores, commands a re-execution of speculative instructions within the ROB of a second processor core of the plurality of processor cores; wherein the speculative instructions are directly fetched from the memory subsystem.

12. The system of claim 7, wherein the cache is a shared cache between at least one of the plurality of processor cores, multiple threads, and multiple processes.

13. A computer program product for mitigating cache-based data security vulnerabilities in a computing environment, by a processor, the computer program product embodied on a non-transitory computer-readable storage medium having computer-readable program code portions stored therein, the computer-readable program code portions comprising:

an executable portion that reads data elements from speculative memory accesses into a speculative buffer maintained exclusively to hold data from the speculative memory accesses, wherein the speculative buffer is associated with each processor core of a plurality of processor cores;

an executable portion that delays data updates of the data elements from the speculative memory accesses to a cache and memory subsystem visible to each of the plurality of processor cores until the speculative memory accesses are committed from a reorder buffer (ROB), wherein the data elements of the speculative memory accesses are withheld from propagation throughout the cache and memory subsystem until being committed so as to appear to the plurality of processor cores as cache misses notwithstanding whether the data elements were read into the speculative buffer from the cache;

an executable portion that flushes data elements of the speculative memory accesses from the speculative buffer upon retiring the speculative memory accesses from a reorder buffer (ROB); and an executable portion that flushes the speculative buffer upon encountering a branch misprediction or exception using the speculative memory accesses.

14. The computer program product of claim 13, further including an executable portion that, upon flushing the data elements of speculative memory accesses, updates the data elements of the speculative memory accesses from the speculative buffer to the cache and memory subsystem.

15. The computer program product of claim 14, further including an executable portion that maintains a cache coherence status for each of the data elements of the speculative memory accesses in the speculative buffer.

16. The computer program product of claim 15, further including an executable portion that propagates the cache coherence status from the speculative buffer to the cache and memory subsystem upon flushing a corresponding data element from the speculative buffer.

17. The computer program product of claim 13, further including an executable portion that, upon determining a fault or rollback within a first processor core of the plurality of processor cores, commanding a re-execution of speculative instructions within the ROB of a second processor core of the plurality of processor cores; wherein the speculative instructions are directly fetched from the memory subsystem.

18. The computer program product of claim 13, wherein the cache is a shared cache between at least one of the plurality of processor cores, multiple threads, and multiple processes.

19. A microprocessor architecture, comprising:

a plurality of processor cores;

a memory subsystem including a cache shared between the plurality of processor cores; wherein cache pollution due to speculative memory accesses within a speculative path is avoided by delaying data updates to the cache and memory subsystem until the speculative memory accesses are resolved;

a speculative buffer in communication with the plurality of processor cores and the memory subsystem; wherein the speculative buffer exclusively maintains data elements of the speculative memory accesses such that a state of the cache remains unchanged until the speculative memory accesses are committed; wherein delaying the data updates includes withholding the data elements from propagation throughout the cache and memory subsystem until being committed so as to appear to the plurality of processor cores as cache misses notwithstanding whether the data elements were read into the speculative buffer from the cache; and wherein the speculative buffer is flushed upon encountering a branch misprediction or exception using the speculative memory accesses; and a reorder buffer (ROB) in communication with the speculative buffer, the plurality of processor cores, and the memory subsystem; wherein the data elements of the speculative memory accesses are flushed from the speculative buffer upon retiring the speculative memory accesses from the ROB.

* * * * *